United States Patent
Yoshimura et al.

(10) Patent No.: US 10,135,996 B2
(45) Date of Patent: Nov. 20, 2018

(54) IMAGE FORMATION APPARATUS, IMAGE PROCESSING SYSTEM, AND CONTROL METHOD

(71) Applicant: Konica Minolta, Inc., Chiyoda-ku, Tokyo (JP)

(72) Inventors: Tomonari Yoshimura, Kyoto (JP); Atsushi Ohshima, Amagasaki (JP)

(73) Assignee: KONICA MINOLTA, INC., Tokyo (JP)

( * ) Notice: Subject to any disclaimer, the term of this patent is extended or adjusted under 35 U.S.C. 154(b) by 140 days.

(21) Appl. No.: 15/166,684

(22) Filed: May 27, 2016

(65) Prior Publication Data

US 2016/0352916 A1    Dec. 1, 2016

(30) Foreign Application Priority Data

May 29, 2015    (JP) .................. 2015-109920

(51) Int. Cl.
| | |
|---|---|
| *H04M 11/00* | (2006.01) |
| *H04W 4/80* | (2018.01) |
| *H04W 4/00* | (2018.01) |
| *H04L 29/08* | (2006.01) |

(52) U.S. Cl.
CPC ......... *H04M 11/007* (2013.01); *H04L 67/143* (2013.01); *H04W 4/008* (2013.01); *H04W 4/80* (2018.02); *H04L 67/12* (2013.01)

(58) Field of Classification Search
CPC ... H04W 4/008; H04W 76/043; H04W 76/00; H04W 4/80; H04W 8/08; H04W 8/24; H04W 76/15; H04W 76/10; H04W 88/02; H04W 88/12; H04L 47/72; G06F 3/1204;
(Continued)

(56) References Cited

U.S. PATENT DOCUMENTS 5,272,016 A  *  12/1993  Ralph .................. B32B 27/32
                                                    428/34.9

FOREIGN PATENT DOCUMENTS

| JP | H09261735 A | 10/1997 |
| JP | 2002215487 A | 8/2002 |
| JP | 2006140800 A | 6/2006 |

(Continued)

OTHER PUBLICATIONS

JP Notice of Grounds of Rejection corresponding to Application No. 2015-109920; dated Jun. 6, 2017.

Primary Examiner — Julio Perez
(74) Attorney, Agent, or Firm — Cantor Colburn LLP (57) ABSTRACT

An image formation apparatus remotely operable smoothly using a terminal device is provided. In an image processing system including a plurality of terminal devices and an MFP capable of wireless communication, when the number of terminal devices connected to the image formation apparatus via wireless communication has reached a threshold value representing a number based on the number of terminal devices with which the MFP can wirelessly communicate, the MFP determines that, of the connected terminal devices, one or more terminal devices satisfying a previously stored condition as a candidate to be disconnected, and the MFP sends notification to request severing the wireless communication. When the MFP obtains permission for disconnection from a terminal device that is a destination of the notification, the MFP severs the wireless communication.

12 Claims, 9 Drawing Sheets

(58) Field of Classification Search
CPC .... G06F 3/1292; G06F 3/1293; G06F 3/1296; G06F 3/1237
See application file for complete search history.

(56) References Cited

FOREIGN PATENT DOCUMENTS

| | | |
|---|---|---|
| JP | 2007094581 A | 4/2007 |
| JP | 2008085792 A | 4/2008 |
| JP | 2011135470 A | 7/2011 |
| JP | 2014143461 A | 8/2014 |

\* cited by examiner

| TERMINAL ID | USER NAME | DATA COMMUNICATION STATE | STATE OF PROCESSING | NOTIFICATION OF END OF JOB |
|---|---|---|---|---|
| TERMINAL A | USER A | DATA COMMUNICATION CURRENTLY UNDERWAY | JOB BEING PROCESSED | NOT REQUIRED |
| TERMINAL B | USER B | NO DATA COMMUNICATION | JOB WAITING FOR PROCESSING | REQUIRED |
| TERMINAL C | USER C | NO DATA COMMUNICATION | JOB WAITING FOR PROCESSING | NOT REQUIRED |
| TERMINAL D | — | NO DATA COMMUNICATION | NO JOB | NOT REQUIRED |
| TERMINAL E | USER E | NO DATA COMMUNICATION | NO JOB | NOT REQUIRED |
| TERMINAL F | USER F | NO DATA COMMUNICATION | SETTING OPERATION CURRENTLY UNDERWAY | NOT REQUIRED |

IMAGE FORMATION APPARATUS, IMAGE PROCESSING SYSTEM, AND CONTROL METHOD

CROSS REFERENCE TO RELATED APPLICATION

This present invention claims priority under 35 U.S.C. § 119 to Japanese Patent Application No. 2015-109920 filed with the Japan Patent Office on May 29, 2015, the entire content of which is hereby incorporated by reference.

BACKGROUND OF THE INVENTION

Field of the Invention

This disclosure relates to an image formation apparatus, an image processing system, a control program, and a communication management method, and particularly to an image formation apparatus remotely operable via wireless communication with a terminal device, an image processing system including that image formation apparatus, a control program for that image formation apparatus, and a communication management method in the image processing system including that image formation apparatus.

Description of the Related Art

There exists an image formation apparatus capable of wireless communication with a terminal device. An image formation apparatus which has a wireless communication function is remotely operable from a terminal device. In order to implement remote control, the image formation apparatus by way of example transmits information to the terminal device via wireless communication for displaying an operation screen. The terminal device transmits to the image formation apparatus via wireless communication information which represents the user's operation position relative to that operation screen. The image formation apparatus determines operation content based on an operation position of the user on the operation screen of the terminal device, and performs an image formation process indicated.

Such a remotely operable image formation apparatus has a limit in the number of terminal devices that the image formation apparatus can accept remote operation therefrom simultaneously depending on its throughput. However, there is a case in which the image formation apparatus may receive requests for wireless communication from a number of terminal devices more than that of terminal devices from which the image formation apparatus can receive such requests. For example, if information for wireless communication that is stored in a terminal device that previously had wireless communication with the image formation apparatus is used to automatically connect the terminal device to the image formation apparatus via wireless communication, the terminal device would automatically be connected to the image formation apparatus via wireless communication simply as the user of the terminal device passes through a range allowing communication with the image formation apparatus. Thus, the number of terminal devices connected to the image formation apparatus via wireless communication would easily reach an upper limit number.

In such a case, using techniques of communication control disclosed in Japanese Laid-Open Patent Publication Nos. 2008-085792, 09-261735, 2006-140800, 2014-143461, etc., is considered. These documents disclose techniques in which when there are requests for communication beyond a number of devices for which simultaneous communication can be done, communication for any device beyond the number of devices for which simultaneous communication can be done is automatically severed. When the above image formation apparatus receives requests for remote operation beyond a number of terminal devices from which the image formation apparatus can accept remote operation, the techniques disclosed in the above patent documents can be utilized to automatically sever communication with any of the terminal devices and thus allow the image formation apparatus to accept additional remote operation.

However, when the techniques disclosed in the above patent documents are applied to the above image formation apparatus, wireless communication with a terminal device while it is remotely controlling the image formation apparatus may be severed, wireless communication with a terminal device of a user who has a high authority of use for the image formation apparatus may be severed, or the like. That is, simply applying the techniques disclosed in the above patent documents to the above image formation apparatus may interfere with remote operation depending on the terminal device disconnected.

SUMMARY OF INVENTION

According to an embodiment, an image formation apparatus is capable of wireless communication with a terminal device. The image formation apparatus includes a communication unit for performing wireless communication with the terminal device, and a control unit for controlling wireless communication with the terminal device. The control unit includes: a determination unit for determining, when a number of terminal devices connected to the image formation apparatus via wireless communication has reached a threshold value representing a number based on a number of terminal devices with which the image formation apparatus can wirelessly communicate via the communication unit, one or more of the terminal devices connected via the wireless communication to the image formation apparatus that satisfies/satisfy a previously stored, first condition, as a candidate to be disconnected; a first notification unit for sending a terminal device determined by the determination unit as the candidate to be disconnected notification to request severing the wireless communication; and a severing unit for performing, in response to permission for the severing being obtained from a terminal device that is a destination of the notification sent by the first notification unit, a process for severing the wireless communication with the terminal device that is the destination of the notification.

According to another embodiment, an image processing system includes a plurality of terminal devices and an image formation apparatus capable of wireless communication with each of the terminal devices. When a number of terminal devices connected to the image formation apparatus via wireless communication has reached a threshold value representing a number based on a number of terminal devices with which the image formation apparatus can wirelessly communicate, the image formation apparatus determines one or more of the terminal devices connected via the wireless communication to the image formation apparatus that satisfies/satisfy a previously stored condition as a candidate to be disconnected, and the image formation apparatus sends a terminal device determined as the candidate to be disconnected notification to request severing the wireless communication; a terminal device of the plurality of terminal devices that is connected to the image formation apparatus via wireless communication and has received the request from the image formation apparatus receives a user operation done in response to the request and notifies the image formation apparatus of permission for/refusal of disconnection based on the user operation; and when the image formation apparatus obtains permission for disconnection from a terminal device that is a destination of the notification, the image formation apparatus severs the wireless communication with the terminal device that permits the disconnection.

According to another embodiment, there is provided a method for controlling a computer mounted in an image formation apparatus capable of wireless communication with a terminal device. The image formation apparatus includes a communication unit for performing wireless communication with the terminal device. The method includes: determining whether a number of terminal devices connected to the image formation apparatus via wireless communication has reached a threshold value representing a number based on a number of terminal devices with which the image formation apparatus can wirelessly communicate via the communication unit; when, in the determining, it is determined that the number of terminal devices connected to the image formation apparatus via the wireless communication has reached the threshold value, determining one or more of the terminal devices connected via the wireless communication to the image formation apparatus that satisfies/satisfy a previously stored, first condition as a candidate to be disconnected; sending a terminal device determined as the candidate to be disconnected notification to request severing the wireless communication; and in response to permission for disconnection being obtained from a terminal device that is a destination of the notification, severing the wireless communication with the terminal device that is the destination of the notification. The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereafter, reference will be made to the drawings to describe the present invention in embodiments. In the following description, identical parts and components are identically denoted. Their names and functions are also identical. Accordingly, they are not described repeatedly.

First Embodiment

<System Configuration>

Figure 1:
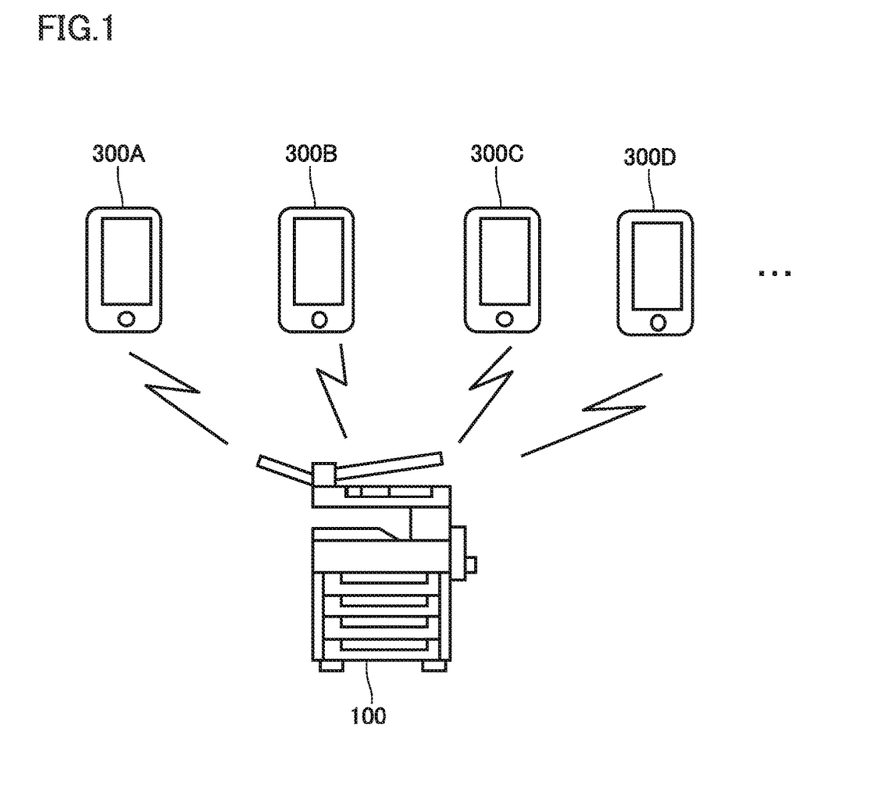
FIG. 1 represents one example of a configuration of an image processing system (hereinafter referred to as a system) according to an embodiment.

FIG. 1 is a diagram representing one example of a configuration of an image processing system (hereinafter referred to as the system) according to the present embodiment. With reference to FIG. 1, this system includes an MFP (Multi-Functional Peripheral) 100 which is an example of an image formation apparatus, and a plurality of terminal devices 300A, 300B, 300C, and 300D. The plurality of terminal devices 300A, 300B, 300C, and 300D are represented by a terminal device 300.

Terminal device 300 is a tablet terminal, a so-called smart phone, a notebook PC (a personal computer), etc., for example.

MFP 100 and terminal device 300 perform wireless communication. Although MFP 100 is capable of wireless communication with a plurality of terminal devices 300 simultaneously, it has an (upper) limit in the number of terminal devices simultaneously connectable via wireless communication.

<Apparatus Configuration>

Figure 2:
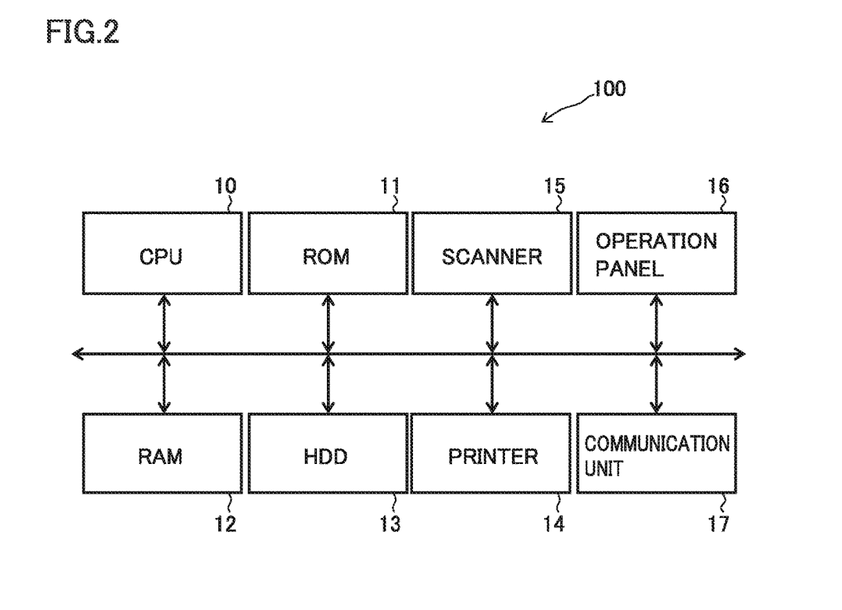
FIG. 2 is a block diagram representing one example of a configuration as an apparatus of an MFP (Multi-Functional Peripheral) included in the system.

FIG. 2 is a block diagram representing one example of a configuration of the MFP as an apparatus. With reference to FIG. 2, MFP 100 includes a CPU (Central Processing Unit) 10 for generally controlling the apparatus, a ROM (Read Only Memory) 11 for storing a program executed by CPU 10, a RAM (Random Access Memory) 12 serving as a working area when the program is executed in CPU 10, and a HDD (Hard Disk Drive) 13 for storing various data such as image data.

Furthermore, MFP 100 includes a printer 14 and a scanner 15 as a configuration for performing an image formation process. Furthermore, MFP 100 includes an operation panel 16 as one example of a display device and an input device. Furthermore, MFP 100 includes a communication unit 17 for performing wireless communication with terminal device 300.

Figure 3:
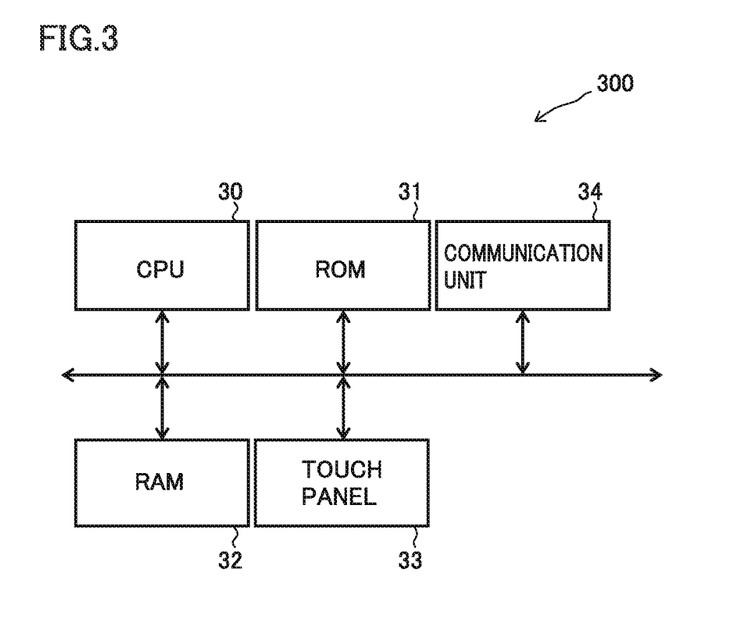
FIG. 3 is a block diagram representing one example of a device configuration of a terminal device included in the system.

FIG. 3 is a block diagram representing one example of a device configuration of terminal device 300. With reference to FIG. 3, terminal device 300 includes a CPU 30 for generally controlling the device, a ROM 31 for storing a program executed in CPU 30, and a RAM 32 for serving as a working area when the program is executed in CPU 30, storing various data and the like.

Furthermore, terminal device 300 includes a touchscreen panel 33 as one example of a display device and an input device. Furthermore, terminal device 300 includes a communication unit 34 for performing wireless communication with MFP 100.

<Outline of Operation>

Figure 4:
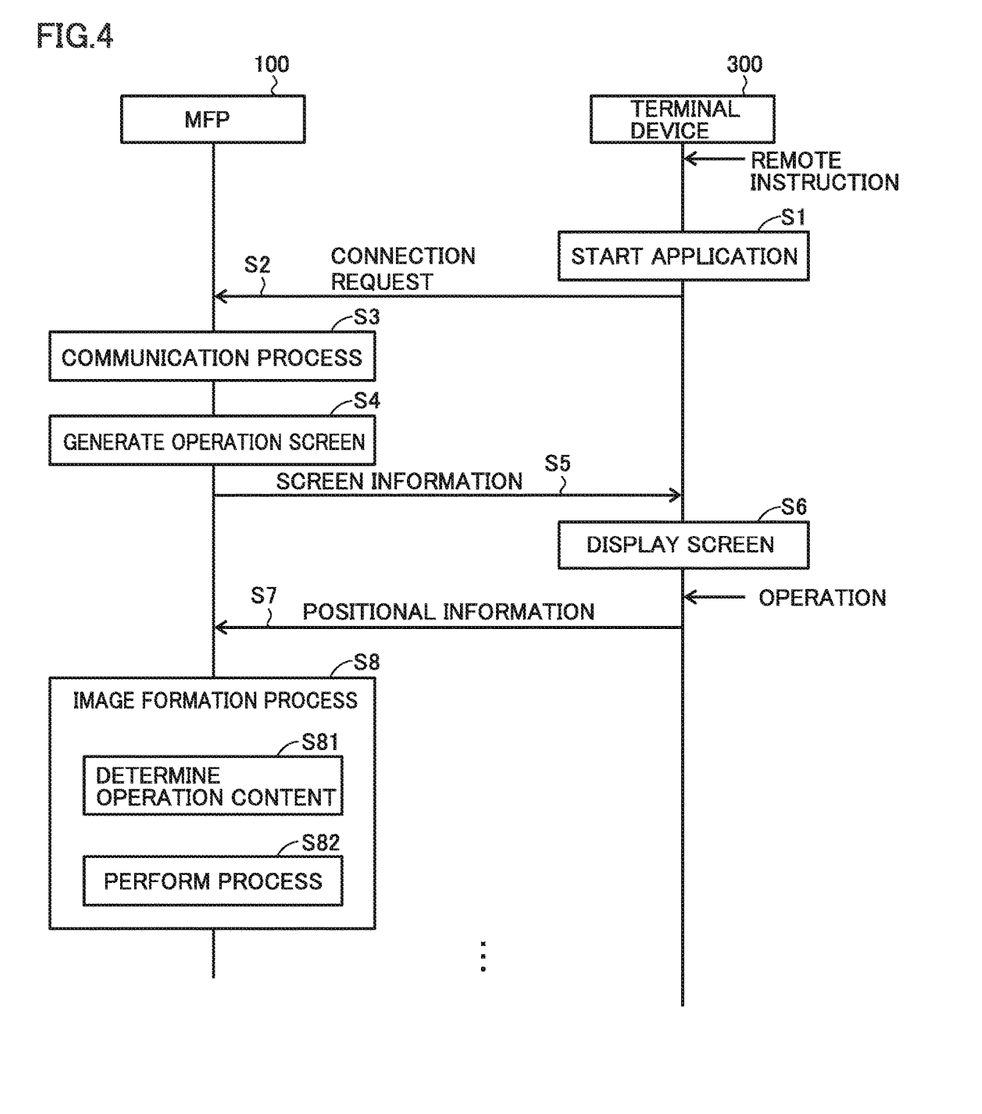
FIG. 4 represents a flow of a remote panel operation in the system.

In this system, the user of terminal device 300 can connect terminal device 300 to MFP 100 via wireless communication to remotely operate MFP 100. FIG. 4 is a diagram outlining an operation in this system when remotely operating MFP 100 using terminal device 300. That is, FIG. 4 is a diagram for illustrating an operation referred to as a so-called remote panel in this system.

With reference to FIG. 4, the user of terminal device 300 initiates an application installed in terminal device 300 for remote operation (step S1). When terminal device 300 initiates that application, terminal device 300 requests MFP 100 present in a range allowing wireless communication, to establish connection via wireless communication (step S2).

In response to the request for connection in step S2, a user authentication process may be performed in MFP 100.

In response to the above request (or when the user authentication is successful), MFP 100 performs a process for performing wireless communication with terminal device 300 (step S3). Then MFP 100 generates an operation screen such as a menu screen used by the user of terminal device 300 to perform remote operation (step S4), and transmits information to terminal device 300 for displaying the screen at terminal device 300 (step S5). Terminal device 300 displays the operation screen on touchscreen panel 33, based on the information from MFP 100 (step S6).

When terminal device 300 receives a user operation done to the displayed operation screen, terminal device 300 transmits to MFP 100 positional information which is information which determines an operation position on the operation screen (step S7). The user of terminal device 300 can use the operation screen of MFP 100 displayed on touchscreen panel 33 of terminal device 300 to request printing, scanning and user authentication from MFP 100, perform various settings of MFP 100, and the like.

MFP 100 having received positional information from terminal device 300 performs a process according to a user operation done at terminal device 300 (for example an image formation process) (step S8). More specifically, MFP 100 determines the user operation's contents based on the positional information received from terminal device 300 (step S81) and performs a process according to the instruction of interest (step S82).

MFP 100 and terminal device 300 repeat the operations of steps S4-S8. Thereby, an operation screen of MFP 100 is displayed on terminal device 300. Then, the user of terminal device 300 can operate MFP 100 by operating the operation screen displayed on touchscreen panel 33 of terminal device 300. Thus, the remote operation which displays an operation screen of MFP 100 on terminal device 300 and receives a user operation is also called a remote panel.

MFP 100 is capable of wireless communication with a plurality of terminal devices 300 simultaneously and receives remote operation from the plurality of terminal devices 300. However, when the number of terminal devices 300 which request MFP 100 to establish connection exceeds an upper limit number of terminal devices with which MFP 100 can communicate simultaneously, MFP 100 cannot connect to terminal device 300 that requests that connection via wireless communication. Accordingly, MFP 100 according to the present embodiment determines a terminal device of terminal devices 300 currently connected via wireless communication that satisfies a previously stored condition as a candidate for which the wireless communication of interest is severed, and MFP 100 notifies the terminal device determined as the candidate of a request for severing wireless communication. Then, MFP 100 severs wireless communication with a terminal device of those notified of the request which provides permission for the severing. By way of example, when there is a request from terminal device 300 for connection, MFP 100 determines whether the number of terminal devices currently connected thereto has reached the upper limit and MFP 100 performs a process for making the number of connections an appropriate number thereof. As another example, MFP 100 may perform a process for making the number of connections appropriate at a set time, predefined time intervals, etc.

Figure 5:
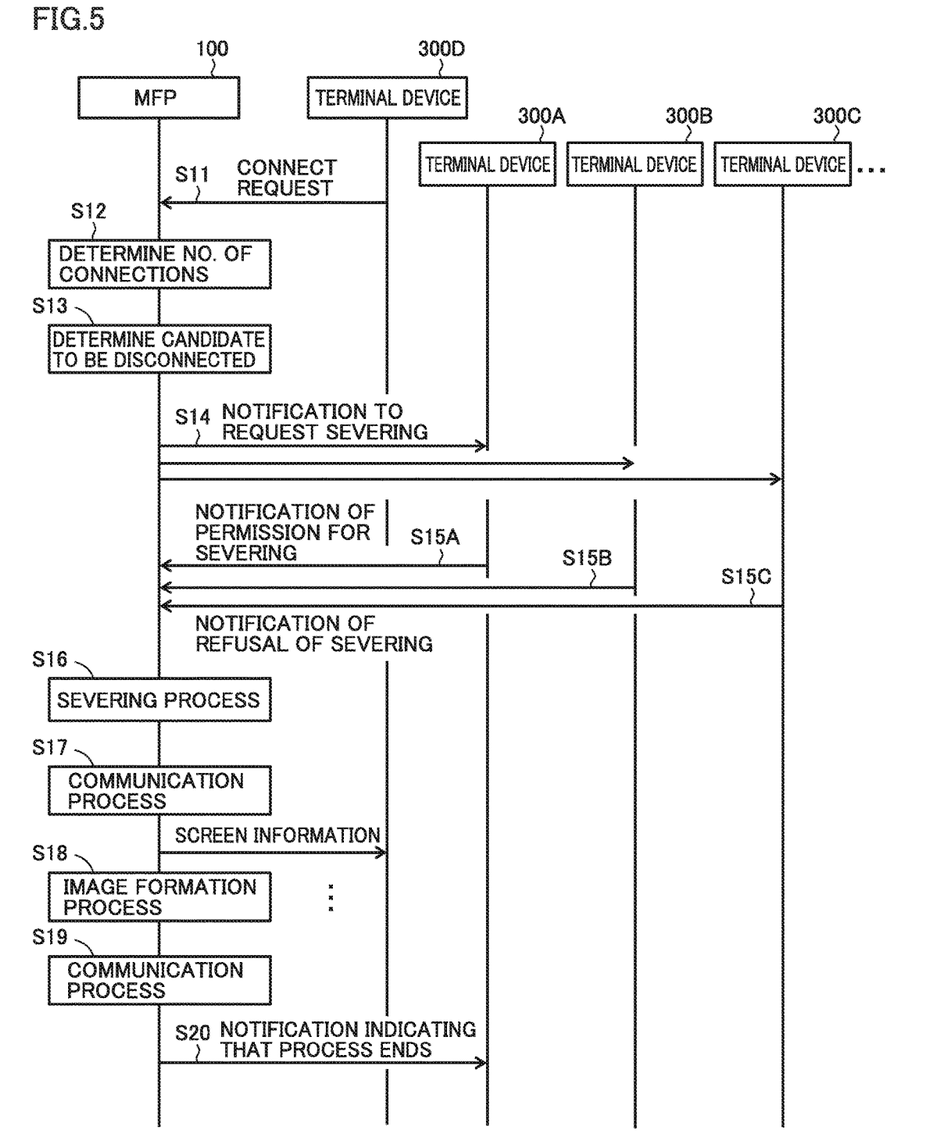
FIG. 5 is a diagram for outlining an operation of the system.

FIG. 5 is a diagram for outlining an operation of this system. With reference to FIG. 5, when MFP 100 is requested by terminal device 300D to establish wireless communication (step S11), MFP 100 determines whether the number of terminal devices 300 currently connected via wireless communication has reached the upper limit number of terminal devices with which MFP 100 can communicate simultaneously (step S12). When the number of terminal devices 300A to 300C currently connected via wireless communication has reached the upper limit number, MFP 100 determines terminal device 300 of terminal devices 300A to 300C currently connected that satisfies a condition applied to select a terminal device as a candidate for severing, as a candidate to have its wireless communication severed (step S13).

Note that in step S12, MFP 100 may determine whether a number based on an upper limit number of terminal devices with which MFP 100 can simultaneously communicate has been reached. For example, MFP 100 sets as a threshold value a number smaller than the upper limit number by a defined number, and determines whether the number of terminal devices 300 currently connected via wireless communication has reached the value of the threshold value. This allows MFP 100 to constantly ensure a number for which connection can be done via wireless communication at least by the above defined number. Accordingly, if MFP 100 cannot sever wireless communication of any of terminal devices by a subsequent operation, MFP 100 can connect an additional terminal device via wireless communication as long as it is within the defined number.

MFP 100 has previously stored therein a condition applied to select a candidate to be disconnected. The condition includes, for example, that (1) data communication is not currently underway, (2) job processing is not currently underway, (3) the user is not a predefined user (e.g., a user having a prescribed authority, such as an administrator), (4) a setting operation of MFP 100 is currently not underway, etc. These conditions (1)-(4) etc. may previously be registered in MFP 100 or set/changed by a specific user such as an administrator. At step S13 MFP 100 for example determines a terminal device which satisfies all of the above conditions (1)-(4) as a candidate to have its wireless communication severed.

Figure 6:
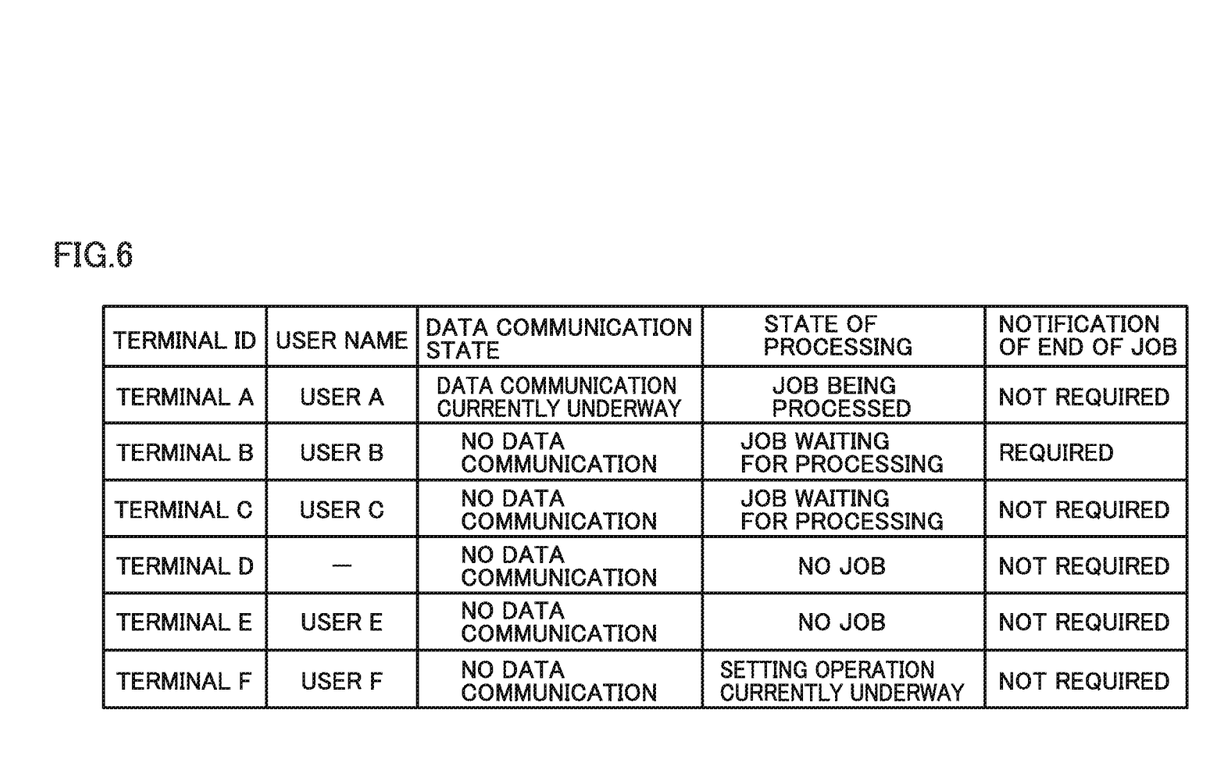
FIG. 6 is a diagram representing one example of information of each of a plurality of terminal devices connected to the MFP via wireless communication.

MFP 100 compares information of each terminal device 300 during wireless communication with the stored conditions and determines a terminal device to be selected as a candidate to have its wireless communication severed. FIG. 6 is a diagram representing one example of information of each of a plurality of terminal devices connected to MFP 100 via wireless communication. MFP 100 determines the information on each item represented in FIG. 6, for each of the terminal devices connected via wireless communication. More specifically, with reference to FIG. 6, for each terminal device, MFP 100 determines information regarding the user of the terminal device (e.g., a user name), a data communication state, a state of a processing according to an instruction from the terminal device, and whether it is necessary to provide notification that processing a job indicated by the terminal device is completed.

MFP 100 may determine, as timed as predefined, the information represented in FIG. 6 for each of the plurality of terminal devices connected via wireless communication, and may store the information to memory such as HDD 13 in a table format as shown in FIG. 6. Alternatively, MFP 100 may determine each piece of the information in FIG. 6 in step S13.

More specifically, MFP 100 can obtain a user name from authentication information from terminal device 300 used for user authentication. In FIG. 6, a terminal device represented as "terminal D" has a user name "–", which represents that user authentication has not been done for the terminal device, i.e., that the terminal device is a terminal device connected via wireless communication without user authentication.

Furthermore, MFP 100 can monitor a state of communication with each terminal device 300 to determine whether data communication is currently underway. "Data communication being currently underway" includes for example that positional information is currently being transmitted from terminal device 300 of interest to MFP 100, that information for displaying an operation screen is currently being transmitted from MFP 100 to terminal device 300 of interest, and that a job to be processed is currently being transmitted from terminal device 300 of interest to MFP 100.

Furthermore, MFP 100 can monitor content of processing based on the positional information received from each terminal device 300, and the state of the processing, to determine a state of a processing according to an instruction received from each terminal device 300. In FIG. 6, a terminal device represented as "terminal F" has as a state of a processing "a setting operation currently underway," which indicates as an example a state in which information for displaying a screen for setting of MFP 100 is transmitted from MFP 100 to terminal device 300 of interest and positional information representing a position of a user operation on the screen has not been transmitted from the terminal device 300 of interest to MFP 100.

Furthermore, MFP 100 as one example analyzes a job that is received from terminal device 300 to obtain a setting included in that job and indicating whether terminal device 300 should be notified of an end of processing of the job when the processing has ended.

In step S13, each piece of information represented in FIG. 6 is compared for example with the above conditions (1)-(4). More specifically, terminal A does not satisfy condition (1). Furthermore, terminal E does not satisfy condition (3). Furthermore, terminal F does not satisfy condition (4). Accordingly, MFP 100 determines the terminal devices represented as terminals B, C, and D as candidates to have their wireless communications severed.

When it is determined in step S13 that terminal devices 300A-300C are candidates for severing, MFP 100 notifies each of terminal devices 300A-300C of a request for severing (step S14).

Figure 7:
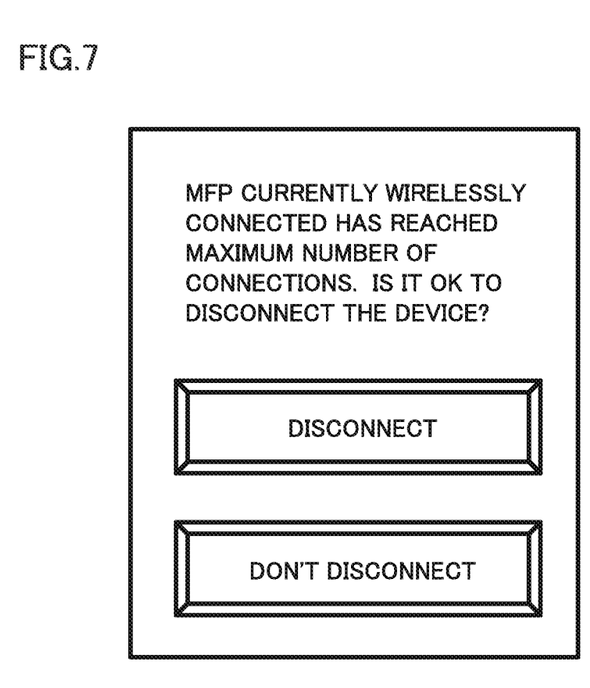
FIG. 7 represents an example of a screen of the terminal device.

When an application currently executed in each of terminal devices 300A-300C for remote operation receives the notification from MFP 100, then for example, it displays the screen of FIG. 7 on touchscreen panel 33 or the like to receive a user operation which indicates whether to permit severing connection with MFP 100 via wireless communication. Then, each terminal device 300 notifies MFP 100 of permission for/refusal of severing according to the user operation (step S15A-S15C).

Of terminal devices 300A-300C notified in step S14 of the request for severing, 300A and 300B notify MFP 100 of permission for severing, and MFP 100 performs a process for severing connection via wireless communication with terminal devices 300A and 300B (step S16).

Thus, MFP 100 severs the wireless communication of a terminal not only which satisfies a condition but also the user of which permits severing. Thus in this system a situation can be avoided in which wireless communication between terminal device 300 and MFP 100 is automatically severed while the user is unaware thereof.

Preferably, MFP 100 does not send notification to request severing wireless communication, for a predefined period of time, to a terminal device of those to which notification to request severing wireless communication has been sent which notifies MFP 100 that the terminal device refuses the severing. This can alleviate combersomeness annoying the user of the terminal device. Accordingly, when MFP 100 is notified by a terminal device of refusal of severing, MFP 100 stores that notification together with a time at which it is received. Then MFP 100 determines as a candidate to have its wireless communication severed a terminal device that satisfies conditions (1)-(4) in step S13 and in addition further satisfies the condition that a predefined period of time has elapsed since notification of refusal of severing was received.

After having severed wireless communication with terminal device 300 from which permission for severing was obtained, MFP 100 performs a process for establishing wireless communication with terminal device 300D requesting connection (step S17). Thereafter, MFP 100 performs an operation represented in FIG. 4 between MFP 100 and terminal device 300D.

Preferably, when a terminal device having had its wireless communication severed has a setting such that when an image formation process performed in response to an instruction of that terminal device ends the terminal device is notified accordingly, then, after MFP 100 ends the image formation process, MFP 100 re-establishes wireless communication with the terminal device and notifies the terminal device that the image formation process has ended. In the example of FIG. 6, the setting is done to send notification to terminal B when processing a job thereof ends. Accordingly, when image processing performed after wireless communication is severed in step S16 (step S18) is processing of a job associated with terminal B, MFP 100 performs a communication process for establishing wireless communication with terminals B (step S19). Then, MFP 100 notifies terminal B that processing the job has ended (step S20). Accordingly, for terminal device 300 set such that when an image formation process has ended the terminal device is notified accordingly, MFP 100 holds information required for wireless connection, even after having severed wireless communication with that terminal device.

<Functional Configuration>

Figure 8:
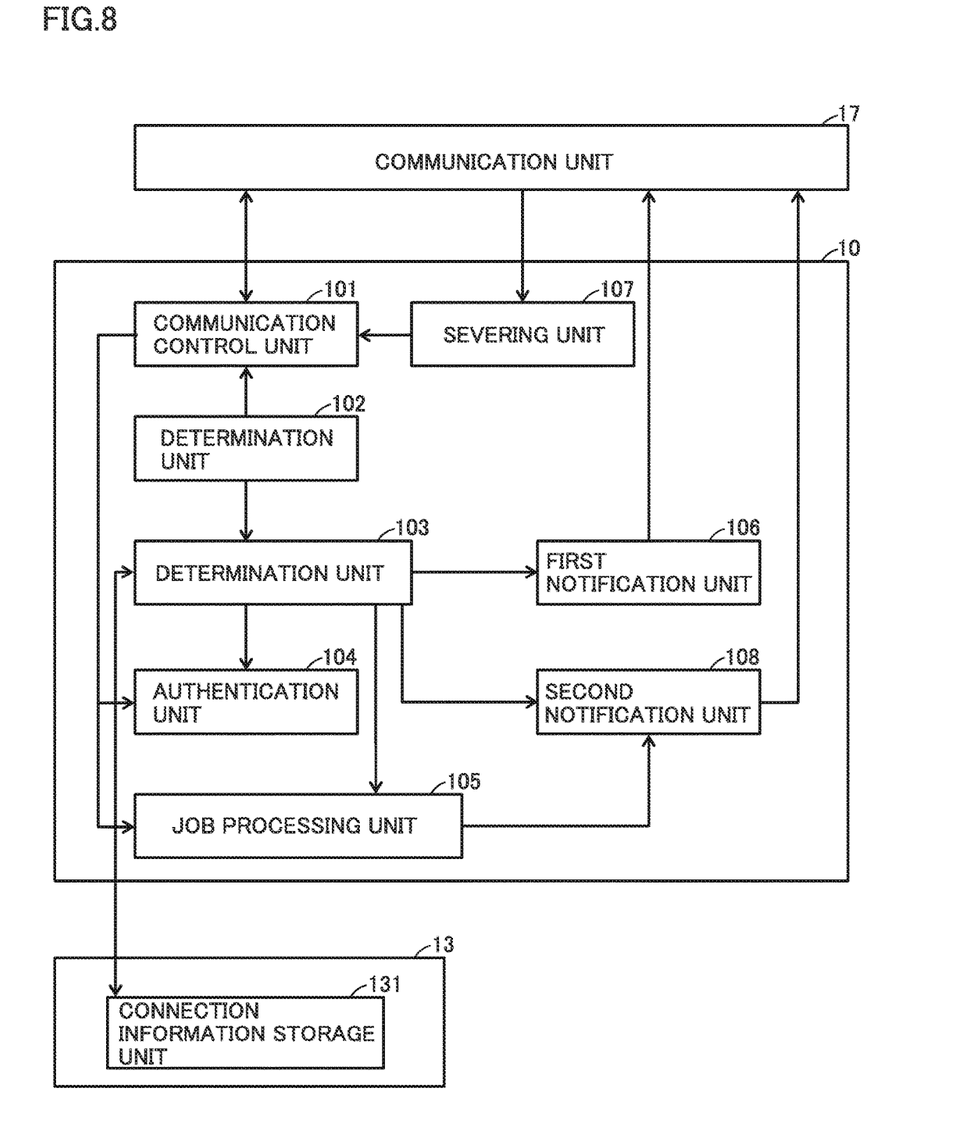
FIG. 8 is a block diagram representing one example of a functional configuration of the MFP.

FIG. 8 is a block diagram representing one example of a functional configuration of MFP 100 for performing the above operation. Each function of FIG. 8 is implemented mainly at CPU 10 of MFP 100 by CPU 10 reading on RAM 12 a program stored in ROM 11, and executing the read program. However, at least a portion of the function may be implemented by other hardware represented in FIG. 2 or other hardware such as electrical circuitry etc. (not shown).

With reference to FIG. 8, CPU 10 of MFP 100 includes a communication control unit 101 for controlling wireless communication done via communication unit 17. CPU 10 further includes a determination unit 102, a determination unit 103, an authentication unit 104 for performing user authentication, a job processing unit 105 for processing a job, a first notification unit 106, and a severing unit 107.

Determination unit 102 determines whether the number of terminal devices 300 currently connected in communication unit 17 via wireless communication has reached a threshold value which is a number based on a number of terminal devices with which wireless communication can be done via communication unit 17. For example, determination unit 102 determines whether the number of terminal devices 300 currently connected via wireless communication has reached an upper limit number of terminal devices with which wireless communication can be done via communication unit 17.

Determination unit 103 determines information of each terminal device 300 connected via wireless communication, as shown in FIG. 6, based on a result of user authentication in authentication unit 104, a state of processing of a job in job processing unit 105, a state of communication with each terminal device 300, content of a job from each terminal device 300, and the like. Determination unit 103 may store the information of FIG. 6, as determined, to a connection information storage unit 131 serving as a memory area of HDD 13.

Furthermore, determination unit 103 has previously stored therein a condition of a terminal device to be a candidate to be disconnected, such as items (1) to (4) above. Determination unit 103 may receive and store these conditions based on a predefined operation via operation panel 16 or may read them from a designated memory.

When determination unit 102 determines that the number of terminal devices currently connected via wireless communication has reached the above threshold value, determination unit 103 compares information represented in FIG. 6 on each terminal device 300 connected via wireless communication with the above conditions (1)-(4) to determine that, of terminal devices 300 connected via wireless communication, one or more terminal devices satisfying the above conditions is/are a candidate to be disconnected.

First notification unit 106 sends terminal device 300 that is determined by determination unit 103 as a candidate to be disconnected notification to request severing wireless communication. Preferably, when a request for wireless communication is received from a terminal device which is currently not connected via wireless communication, and the number of terminal devices connected via wireless communication has reached the upper limit number (the threshold value), first notification unit 106 sends the above notification to a terminal device determined as a candidate to be disconnected.

Furthermore, preferably, for a terminal device of terminal devices determined as candidates to be disconnected which did not provide permission for severing in response to notification previously sent by first notification unit 106, after at least a predefined period of time has elapsed since the previous notification, first notification unit 106 sends notification to that terminal device to request severing wireless communication. Accordingly, preferably, determination unit 103 determines as a candidate to have its wireless communication severed one or more terminal devices that satisfies/satisfy conditions (1)-(4) and in addition further satisfies/satisfy the condition that a predefined period of time has elapsed since notification of refusal of severing was received.

When severing unit 107 obtains permission for severing from a terminal device which is a destination of notification sent by first notification unit 106, severing unit 107 performs a process for severing wireless communication with the terminal device that is the destination of the notification.

Preferably, determination unit 103 previously stores a further condition, and determines a terminal device further satisfying that condition as a terminal device for which, in a case where an image formation process based on an instruction from the terminal device ends after the terminal device has had its wireless communication severed, wireless communication is re-established and notification is sent thereto indicating that the image formation process has ended. The condition may be a setting included in a job received from the terminal device, for example. In that case, determination unit 103 determines whether the above condition is satisfied by analyzing a job received from each terminal device connected via wireless communication. Alternatively, the above condition may be authority which the user has, a period of time after an instruction to process a job is received before wireless communication is severed, the job's data size, and the like.

Preferably, CPU 10 further includes second notification unit 108. For a terminal device of those having had wireless communications severed by severing unit 107 which is determined by determination unit 103 as a terminal device further satisfying the above condition, when an image formation process based on an instruction from the terminal device ends after the severing of the wireless communication, second notification unit 108 reestablishes wireless communication with the terminal device and sends notification thereto that the image formation process has ended.

<Operation Flow>

Figure 9:
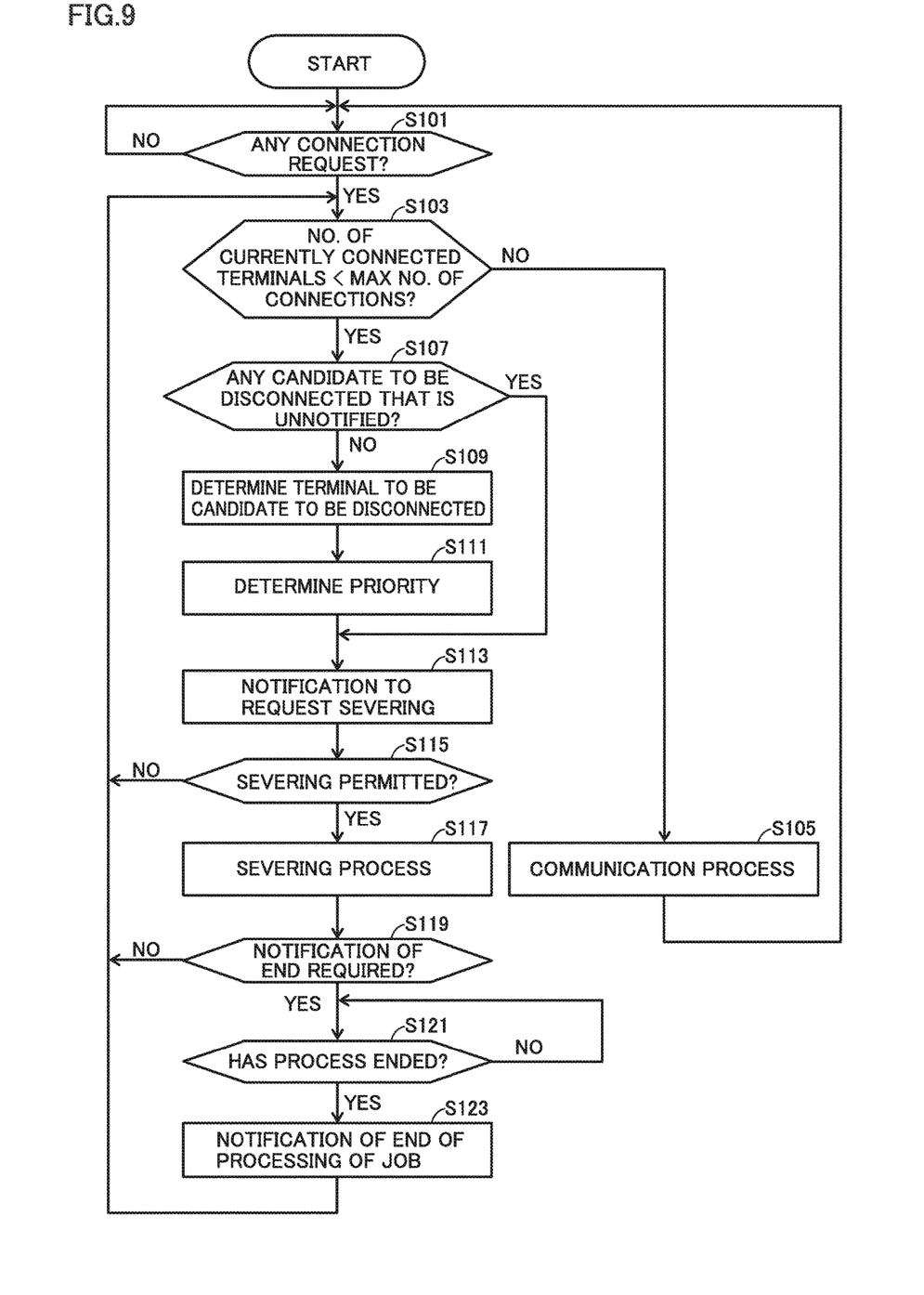
FIG. 9 is a flowchart representing a specific example of a flow of an operation of the MFP.

FIG. 9 is a flowchart representing a specific example of a flow of an operation of MFP 100. The operation represented in the FIG. 9 flowchart is implemented by MFP 100's CPU 10 reading on RAM 12 a program stored in ROM 11, and executing the read program to exhibit each function of FIG. 8.

With reference to FIG. 9, when CPU 10 of MFP 100 receives a connection request via wireless communication from a terminal device which is not connected via wireless communication (YES at step S101), CPU 10 determines whether the number of terminal devices currently connected via wireless communication has reached a threshold value based on an upper limit value set for the number of connectable terminal devices (e.g., an upper limit number thereof) (step S103). When the number of terminal devices connected via wireless communication has not reached the upper limit (NO at step S103) CPU 10 performs a communication process for performing wireless communication with the terminal device that requests connection (step S105). Thereafter, CPU 10 performs communication with the terminal device for the remote panel, etc.

When the number of terminal devices connected via wireless communication has reached the upper limit (YES at step S103), then, unless wireless communication with any of the terminal devices is severed, wireless communication with an additional terminal device cannot be established. Accordingly, CPU 10 determines a terminal device to be a candidate to be disconnected (step S109). Herein, CPU 10 determines information of each terminal device connected via wireless communication, as shown in FIG. 6, and compares it with the above conditions (1)-(4) to determine a terminal device which satisfies all these conditions as a candidate to be disconnected. Then, CPU 10 sends the terminal device determined in step S109 notification to request severing (step S113).

When permission for severing is returned from a terminal device that is a receiver of the above notification (YES at step S115), CPU 10 performs a process for severing wireless communication with the terminal device (step S117).

After step S117, or when refusal of severing is returned from the terminal device that is the receiver of the above notification (NO at step S115), CPU 10 repeats step S103 et seq. until wireless communication with the terminal device that requested connection at step S101 can be established.

Preferably, CPU 10 determines whether a terminal device having had its wireless communication severed has a setting done such that when an image formation process based on an instruction of that terminal device ends the terminal device is notified accordingly (step S119). If the terminal device having had its wireless communication severed is a terminal device with the above setting done (YES at step S119), then, when an image formation process based on an instruction from the terminal device ends after the terminal device has had its wireless communication severed in step S117 (YES at step S121), CPU 10 resumes wireless communication with the terminal device and notifies the terminal device that the image formation process has ended (step S123). CPU 10 may sever wireless communication with the above terminal device after the notification that the image formation process has ended.

<Effect of Embodiment>

By performing the above operation in this system, when there is a request for establishment of wireless communication from a terminal device beyond a threshold value set for the number of terminal devices with which MFP 100 can wirelessly communicate, wireless communication of a terminal device connected to MFP 100 is not severed automatically, but is severed after the terminal device's user provides permission to do so. Thus the terminal device's wireless communication with MFP 100 is not severed while the user of the terminal device does not have an intention to do so, and the number of terminal devices connected to MFP 100 via wireless communication can efficiently be made appropriate.

Furthermore, MFP 100 determines a terminal device, based on a previously stored condition, to be a candidate to have its wireless communication severed, and then MFP 100 sends notification to that terminal device to request severing. As such, MFP 100 does not issue a request for severing wireless communication to a terminal device which is determined, based on a state of processing in MFP 100 of a job indicated by the terminal device, a state of a communication between MFP 100 and the terminal device, authority of the user of the terminal device, and the like, to be unsuitable for severing wireless communication. Accordingly, wireless communication between a terminal device in operation such as remotely operating MFP 100 and MFP 100 is not severed. Furthermore, unnecessary notification is not sent to the user of such a terminal device and the user's operability is not prevented.

Accordingly, in this system, remote operation of MFP 100 using a terminal device can be done smoothly.

Second Embodiment

According to a second embodiment, when MFP 100 determines a plurality of terminal devices as candidates to have their wireless communications severed, MFP 100 prioritizes the plurality of terminal devices for disconnection. In addition to the conditions of the above items (1)-(4), determination unit 103 of MFP 100 according to the second embodiment has a condition stored therein for the prioritization. The condition for the prioritization includes the user's authority, a period of time of connection via wireless communication, job throughput, and a combination thereof, for example.

In addition to the above described operation, CPU 10 of MFP 100 according to the second embodiment performs an operation for the prioritization, as represented in FIG. 9. More specifically, with reference to FIG. 9, once CPU 10 has determined in step S109 a plurality of terminal devices to be candidates to be disconnected, furthermore, CPU 10 prioritizes the plurality of terminal devices (step S111). CPU 10 of MFP 100 according to the second embodiment sends notification in step S113 to request severing wireless communication according to the priority. For example, CPU 10 sends the above notification in step S113 to a predefined number of terminal devices (e.g., one terminal device) successively from a terminal device of high priority. In that case, CPU 10, after having determined that the number of terminal devices connected via wireless communication has reached the upper limit number, confirms whether there is any terminal device determined as a candidate to have its wireless communication severed to which the above notification has not been sent (Step S107). If there is any unnotified terminal device (YES at step S107) CPU 10 sends the above notification to the unnotified terminal device (step S113). In that case, when notification to permit disconnection is received from a terminal device of high priority, CPU 10 severs wireless communication with that terminal device without sending the above notification to a terminal device of low priority.

<Effect of Embodiment>

Performing the above operation in this system for example allows the terminal device of a user having a higher authority to be assigned a lower priority, a terminal device connected to MFP 100 for a longer period of time to be assigned a higher priority, or the like to increase the possibility that the terminal device of a user having a lower authority or a terminal device connected to MFP 100 for a longer period of time have severed its wireless communication with MFP 100. That is, notification of a request to sever wireless communication is issued in an order with importance of remote operation, a possibility of severing wireless communication, and the like taken into consideration, and the number of terminal devices connected to MFP 100 via wireless communication can efficiently be made appropriate.

Accordingly, in this system, remote operation of MFP 100 using a terminal device can be done smoothly.

<Other Examples>

The disclosed feature is implemented by one or more modules. For example, this feature may be implemented by a circuit element and other hardware module, a software module which defines a processing which implements the feature, or a combination of the hardware module and the software module.

It can also be provided as a program which is a combination of one or more software modules for causing the MFP and the terminal device to perform the above-described operation. Such a program can be recorded in a flexible disk that is an accessory of a computer, a CD-ROM (Compact Disk-Read Only Memory), a ROM, a RAM, a memory card or a similar, computer readable recording medium and thus provided as a program product. Alternatively, it can also be recorded in a recording medium such as a hard disk incorporated in a computer, and thus provided. Furthermore, the program can also be provided by downloading via a network.

Note that the program according to this disclosure may invoke a required module of program modules provided as a portion of an operating system (OS) of a computer, in a prescribed sequence, as timed as prescribed, and may cause the module to perform a process. In that case, the program per se does not include the above module and cooperates with the OS to perform the process. Such a program that does not include the module can also be included in the program according to the present invention.

Furthermore, the program according to the present discloser may be incorporated in and provided as a portion of another program. The present program in this case also per se does not include the module(s) included in the other program and cooperates with the other program to perform a process. Such a program incorporated in another program can also be included in the program according to the present disclosure.

A program product provided is installed in a program storing unit, such as a hard disk, and executed. Note that the program product includes a program per se and a recording medium having the program recorded therein.

While the present invention has been described in embodiments, it should be understood that the embodiments disclosed herein are illustrative and non-restrictive in any respect. The scope of the present invention is defined by the terms of the claims, and is intended to include any modifications within the meaning and scope equivalent to the terms of the claims.

What is claimed is:

1. An image formation apparatus capable of wireless communication with a terminal device, comprising:
   a communication unit for performing wireless communication with the terminal device;
   a control unit for controlling wireless communication with the terminal device, the control unit including:
      a determination unit for determining, when a number of terminal devices connected to the image formation apparatus via wireless communication has reached a threshold value representing a number based on a number of terminal devices with which the image formation apparatus can wirelessly communicate via the communication unit, one or more of the terminal devices connected via the wireless communication to the image formation apparatus that satisfies/satisfy a previously stored, first condition, as a candidate to be disconnected;
      a first notification unit for sending the one or more terminal devices determined by the determination unit as the candidate to be disconnected notification to request severing the wireless communication; and
      a severing unit for performing, in response to permission for the severing being obtained from the one or more terminal devices that is a destination of the notification sent by the first notification unit, a process for severing the wireless communication with the terminal device that is the destination of the notification.

2. The image formation apparatus according to claim 1, wherein when a number of terminal devices having been connected to the image formation apparatus via wireless communication when the image formation apparatus receives a request for the wireless communication from a terminal device has reached the threshold value, the first notification unit sends a terminal device determined as the candidate to be disconnected notification to request severing the wireless communication.

3. The image formation apparatus according to claim 1, wherein the control unit further includes a second notification unit configured such that, for a terminal device which has had the wireless communication severed by the severing unit and satisfies a previously stored, second condition, when a process based on an instruction from the terminal device satisfying the second condition ends after the terminal device has had the wireless communication severed, the second notification unit sends the terminal device satisfying the second condition notification via the wireless communication indicating that the process has ended.

4. The image formation apparatus according to claim 1, wherein:
   the determination unit further prioritizes a plurality of terminal devices determined as the candidate to be disconnected; and the first notification unit sends the plurality of terminal devices determined as the candidate to be disconnected notification to request the disconnection, in an order based on the prioritization, until the number of terminal devices connected via the wireless communication achieves a number which does not exceed the threshold value.

5. The image formation apparatus according to claim 1, wherein, for a terminal device of the one or more terminal devices determined as the candidate to be disconnected which does/do not provide permission for disconnection in response to the notification previously sent by the first notification unit, after at least a predefined period of time has elapsed since the previous notification, the first notification unit sends notification to that terminal device to request severing the wireless communication.

6. An image processing system comprising:
   a plurality of terminal devices; and
   an image formation apparatus capable of wireless communication with each of the terminal devices, wherein:
      when a number of terminal devices connected to the image formation apparatus via wireless communication has reached a threshold value representing a number based on a number of terminal devices with which the image formation apparatus can wirelessly communicate, the image formation apparatus determines one or more of the terminal devices connected via the wireless communication to the image formation apparatus that satisfies/satisfy a previously stored condition as a candidate to be disconnected, and the image formation apparatus sends the one or more terminal devices determined as the candidate to be disconnected notification to request severing the wireless communication;
      a terminal device of the plurality of terminal devices which is connected to the image formation apparatus via wireless communication and has received the request from the image formation apparatus receives a user operation done in response to the request and notifies the image formation apparatus of permission for/refusal of disconnection based on the user operation; and
      when the image formation apparatus obtains permission for disconnection from the one or more terminal devices which is a destination of the notification, the image formation apparatus severs the wireless communication with the terminal device that permits the disconnection.

7. A method for controlling a computer mounted in an image formation apparatus capable of wireless communication with a terminal device, the image formation apparatus including a communication unit for performing wireless communication with the terminal device, the method comprising:
   determining whether a number of terminal devices connected to the image formation apparatus via wireless communication has reached a threshold value representing a number based on a number of terminal devices with which the image formation apparatus can wirelessly communicate via the communication unit;
   when, in the determining, it is determined that the number of terminal devices connected to the image formation apparatus via the wireless communication has reached the threshold value, determining one or more of the terminal devices connected via the wireless communication to the image formation apparatus that satisfies/satisfy a previously stored, first condition as a candidate to be disconnected;

sending the one or more terminal devices determined as the candidate to be disconnected notification to request severing the wireless communication; and in response to permission for disconnection being obtained from the one or more terminal devices that is a destination of the notification, severing the wireless communication with the terminal device that is the destination of the notification.

8. The method according to claim 7, wherein the sending includes sending, when a number of terminal devices having been connected to the image formation apparatus via wireless communication when the image formation apparatus receives a request for the wireless communication from a terminal device has reached the threshold value, a terminal device determined as the candidate to be disconnected notification to request severing the wireless communication.

9. The method according to claim 7, further comprising, for a terminal device which has had the wireless communication severed and satisfies a previously stored, second condition, when a process based on an instruction from the terminal device satisfying the second condition ends after the terminal device has had the wireless communication severed, sending the terminal device satisfying the second condition notification via the wireless communication indicating that the process has ended.

10. The method according to claim 7, wherein:

the determining one or more of the terminal devices further includes prioritizing a plurality of terminal devices determined as the candidate to be disconnected; and the sending includes sending the plurality of terminal devices determined as the candidate to be disconnected notification to request the disconnection, in an order based on the prioritization, until the number of terminal devices connected via the wireless communication achieves a number which does not exceed the threshold value.

11. The method according to claim 7, wherein the sending includes sending a terminal device of the one or more terminal devices determined as the candidate to be disconnected which does/do not provide permission for disconnection in response to a notification sent prior to the notification of interest notification to request severing the wireless communication, after at least a predefined period of time has elapsed since the prior notification.

12. A non-transitory storage medium encoded with a computer readable program executed by a computer of the image formation apparatus, the program causing the computer to perform the method according to claim 7.

* * * * *